US012521581B2

(12) United States Patent
Marino

(10) Patent No.: US 12,521,581 B2
(45) Date of Patent: Jan. 13, 2026

(54) PROTECTION DEVICE FOR THE RESPIRATORY TRACT

(71) Applicant: Silvio Marino, Aulla (IT)

(72) Inventor: Silvio Marino, Aulla (IT)

( * ) Notice: Subject to any disclaimer, the term of this patent is extended or adjusted under 35 U.S.C. 154(b) by 520 days.

(21) Appl. No.: 18/026,231

(22) PCT Filed: Oct. 5, 2021

(86) PCT No.: PCT/EP2021/025383
§ 371 (c)(1),
(2) Date: Mar. 14, 2023

(87) PCT Pub. No.: WO2022/078624
PCT Pub. Date: Apr. 21, 2022

(65) Prior Publication Data
US 2023/0364450 A1 Nov. 16, 2023

(30) Foreign Application Priority Data
Oct. 15, 2020 (IT) ........................ 102020000024334

(51) Int. Cl.
*A62B 18/00* (2006.01)
*A62B 18/02* (2006.01)
*A62B 18/08* (2006.01)
*A62B 18/10* (2006.01)

(52) U.S. Cl.
CPC ............ *A62B 18/02* (2013.01); *A62B 18/084* (2013.01); *A62B 18/10* (2013.01)

(58) Field of Classification Search
None
See application file for complete search history.

(56) References Cited

U.S. PATENT DOCUMENTS 3,441,020 A * 4/1969 Aasen ............... A61M 16/0683 128/205.25
5,853,002 A * 12/1998 Kawasaki ............. A61M 11/06 128/200.14
7,931,025 B2 * 4/2011 Eaton ............... A61M 16/0633 24/686
8,042,542 B2 * 10/2011 Ging ................ A61M 16/0616 128/206.28

(Continued)

FOREIGN PATENT DOCUMENTS

CN 111513394 A 8/2020
WO 01/32265 A2 5/2001
WO 2020/163064 A1 8/2020

*Primary Examiner* — LaToya M Louis
(74) *Attorney, Agent, or Firm* — Richard M. Goldberg

(57) ABSTRACT

Protection device of the respiratory tract of a person including a mask body of any convenient rigid or semi-rigid material suitable to cover the mouth and nose of a person, at least one pair of housings, placed on the sides of the mask body designed to hold a sleeve inside each of them, a spring inserted inside each sleeve, whose first end is fixed to the lower edge of the sleeve while the second end has a fixing arrangement which allow the two springs to join together behind the head of the person wearing the device, wherein each spring is substantially coated for a first portion, the one fixed in the sleeve, by a cylinder of non-breathable fabric material and for a second portion, by a cylinder of breathable fabric material or other suitable material capable of filtering the air.

11 Claims, 4 Drawing Sheets

(56) References Cited

U.S. PATENT DOCUMENTS 8,051,855 B2 * 11/2011 Ho .................... A61M 16/0825 128/206.28
8,783,253 B2 * 7/2014 Flaherty ............ A41D 13/1138 128/206.13
9,616,190 B2 * 4/2017 Rummery ......... A61M 16/0683
9,950,131 B2 * 4/2018 Ng .................... A61M 16/0694
9,981,102 B2 * 5/2018 Veliss ................... A61M 16/06
9,987,451 B2 * 6/2018 Stegman ........... A61M 16/0003
10,034,994 B2 * 7/2018 McAuley .......... A61M 16/0622
10,118,009 B2 * 11/2018 Darkin ............. A61M 16/0825
10,500,363 B2 * 12/2019 Raje .................. A61M 16/0655
11,986,595 B2 * 5/2024 McLaren .......... A61M 16/0816
2008/0110465 A1 5/2008 Welchel
2008/0230066 A1 * 9/2008 Chandaria ............. A41D 13/11 128/206.13
2008/0230068 A1 * 9/2008 Rudolph ........... A61M 16/0683 128/206.28
2009/0126739 A1 * 5/2009 Ng .................... A61M 16/0638 128/205.25
2011/0265796 A1 * 11/2011 Amarasinghe .... A61M 16/0616 128/206.28
2012/0204869 A1 * 8/2012 Gunaratnam ..... A61M 16/0605 128/202.27
2012/0204870 A1 * 8/2012 McAuley .......... A61M 16/0622 128/207.18
2013/0014760 A1 * 1/2013 Matula, Jr. ........ A61M 16/0633 128/205.25
2013/0228173 A1 * 9/2013 Busch ............... A61M 16/0633 128/202.27
2014/0083431 A1 * 3/2014 Burz ................. A61M 16/0633 264/255
2014/0166018 A1 * 6/2014 Dravitzki .............. A61M 16/06 128/207.13
2014/0174446 A1 * 6/2014 Prentice ............ A61M 16/0816 128/205.25
2014/0202463 A1 * 7/2014 Ging ................. A61M 16/0057 128/205.25
2014/0283822 A1 * 9/2014 Price ................. A61M 16/0633 128/202.17
2014/0305433 A1 * 10/2014 Rothermel ............ A61M 16/06 128/202.27
2014/0373847 A2 * 12/2014 Ng ........................ A61M 16/06 128/205.25
2015/0352308 A1 * 12/2015 Cullen .............. A61M 16/0875 128/205.25
2016/0279371 A1 * 9/2016 Dravitzki .......... A61M 16/0616
2016/0367778 A1 * 12/2016 Eves ................. A61M 16/0638
2017/0021123 A1 * 1/2017 Chang ............... A61M 16/0683
2017/0080173 A1 * 3/2017 Barlow ............. A61M 16/0816
2017/0128687 A1 * 5/2017 Price ................. A61M 16/0633
2017/0274168 A1 * 9/2017 Kwok ................. A61M 16/065
2017/0333657 A1 * 11/2017 Stephenson ......... A61M 16/208
2018/0001046 A1 * 1/2018 Rummery .......... A61M 16/0611
2018/0021536 A1 * 1/2018 Ng .................... A61M 16/0875 128/206.28
2018/0021537 A1 * 1/2018 Ging .................... A62B 18/084 128/202.27
2018/0036505 A1 * 2/2018 Bornholdt ......... A61M 16/0683
2018/0043127 A1 * 2/2018 Matula, Jr. ........ A61M 16/0638
2018/0064899 A1 * 3/2018 Ewers ............... A61M 16/0666
2018/0071475 A1 * 3/2018 Howard ............ A61M 16/0825
2018/0361096 A1 * 12/2018 Grashow ........... A61M 16/0622
2019/0224436 A1 * 7/2019 Cheng ................. A61M 16/065

* cited by examiner 10
12,13
6
5
8
14
13
12
10,10'
9,9'
7,7'
8,8'

PROTECTION DEVICE FOR THE RESPIRATORY TRACT

BACKGROUND OF THE INVENTION

This invention refers to a respiratory tract protection device.

Various devices for protecting the airways from fine dust, fumes and liquid mists (aerosols) are commonly known. Aerosols and fine dust particles are some of the most hazardous health risks, as unfortunately we have been able to verify with the spread of the well-known Covid-19 virus, being almost invisible in breathable air. Filter masks against these particles offer protection from these dangers and are divided into three protection classes: FFP1, FFP2 and FFP3.

These masks are, moreover, prescribed in the workplace where the so-called occupational exposure limit or OEL value is exceeded. This indicates the maximum permissible concentration of dust, smoke or aerosols in the breathing air, which does not cause harm to health. When this value is exceeded, the use of filter masks becomes mandatory.

With regard to surgical masks, these have the purpose of preventing the wearer from contaminating the environment, as they limit the transmission of infectious agents and fall within the scope of medical devices referred to in Legislative Decree 24 Feb. 1997, no. 46 and successive modifications. They are used in hospitals and in places where assistance is provided to patients (for example, care homes, clinics, etc.) and, to be considered safe, they must be produced in compliance with the technical standard UNI EN 14683:2019 which provides features and test methods to evaluate resistance to liquid splashes, breathability, bacterial filtration efficiency, etc.

FFP1 masks have a reduced filtering capacity from the outside towards the wearer, of about 20%, mainly due to poor adherence to the face.

Traditional masks, however, take the air from the front and this is particularly disadvantageous as dust, fumes, aerosols are normally concentrated in the front part of the face as the operator is normally turned towards the work area and this also happens when two or more people talk to each other.

Another drawback is the fact that inside the mask there is poor air circulation which can have negative consequences for the person's health.

SUMMARY OF THE INVENTION

The purpose of this invention is to obviate these drawbacks by providing a respiratory protection device that is more effective than the existing ones from the point of view of protection from agents harmful to health and, at the same time, is able to improve the quality of air taken from the outside.

A further aim of this invention is to provide a protective device that is easily transportable when not in use and quick to wear. A respiratory protection device is therefore provided according to the characteristics of the attached claims.

BRIEF DESCRIPTION OF THE DRAWINGS

The invention will be better explained through the following description which shows the preferred embodiments made with the aid of the attached figures which respectively illustrate.

DETAILED DESCRIPTION

Figure 1:
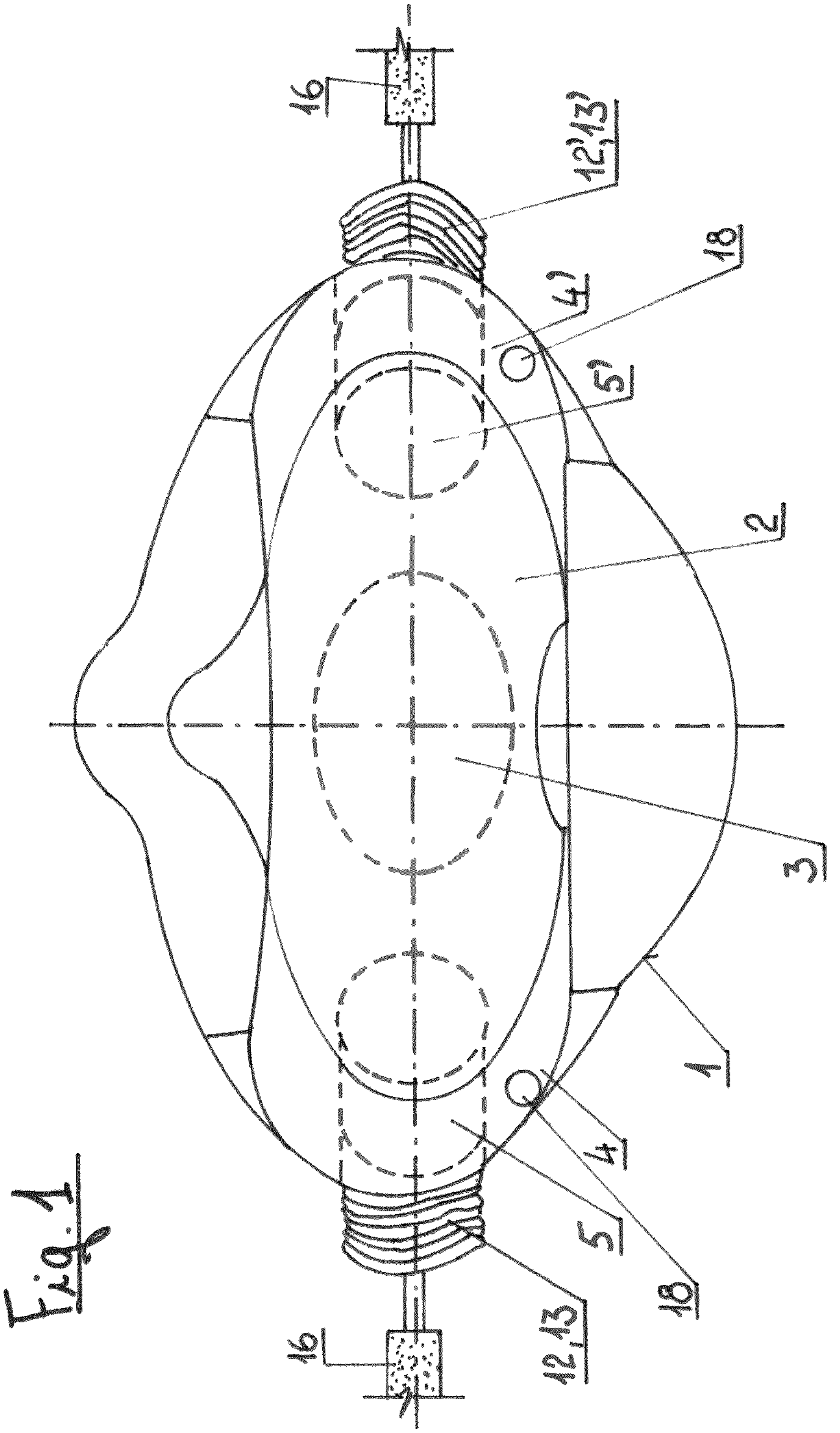
FIG. 1 illustrates a front view from the outside of the device according to this invention.
Figure 2:
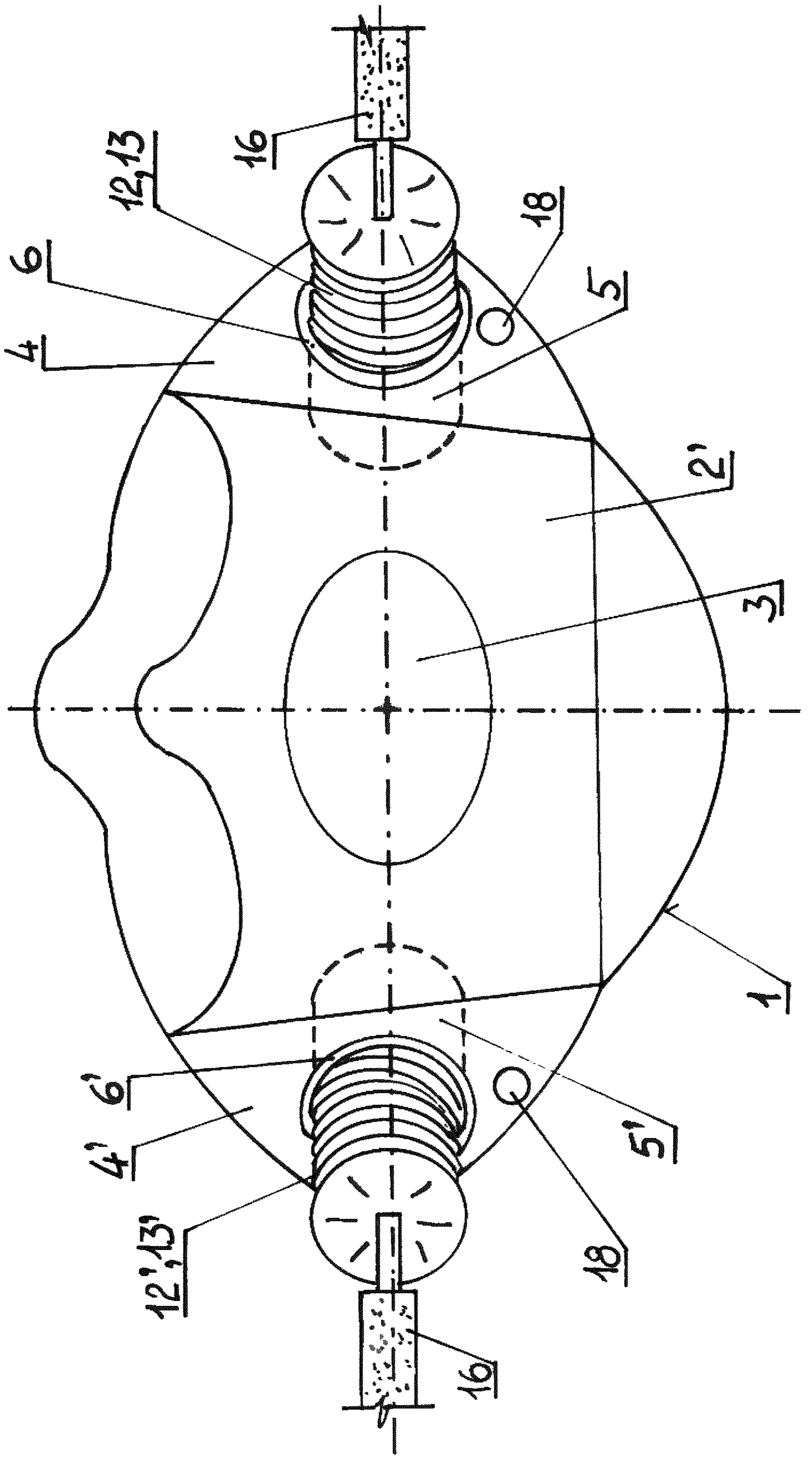
FIG. 2 illustrates a front view from the inside of the device according to this invention.
Figure 3:
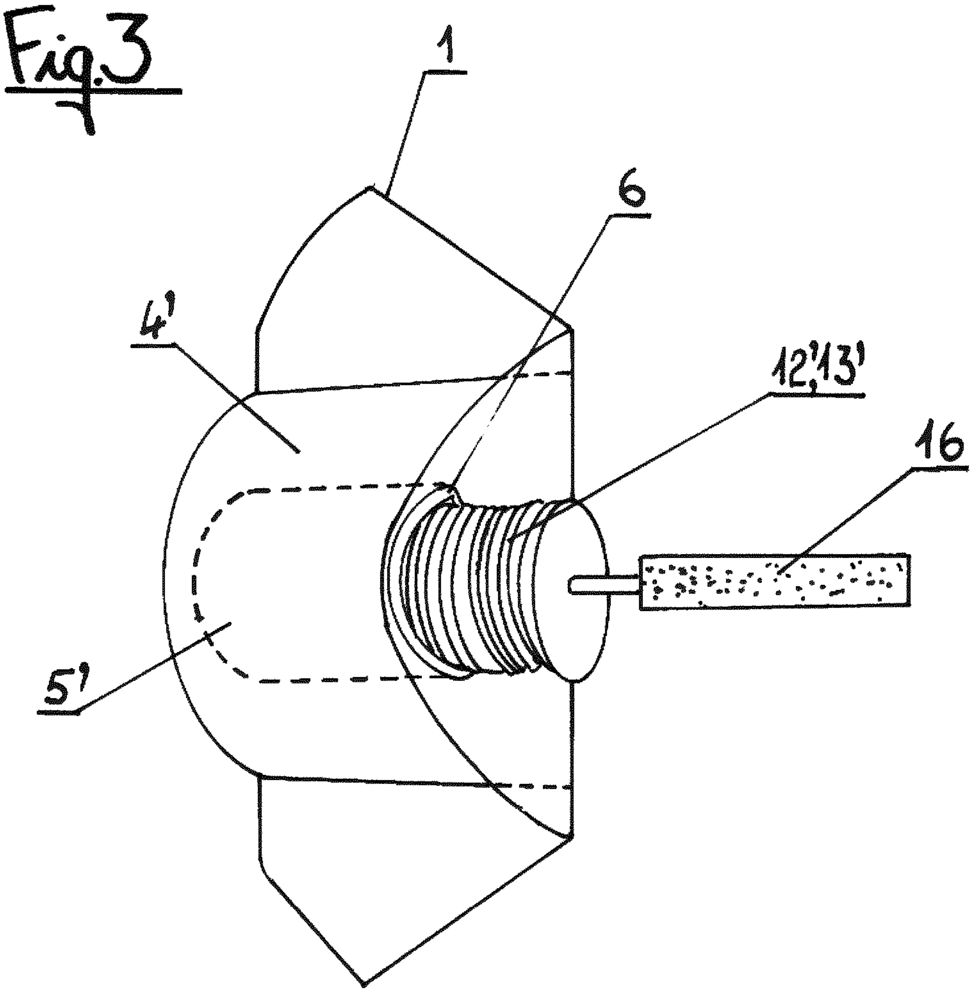
FIG. 3 illustrates a side view of the device according to this invention.
Figure 7:
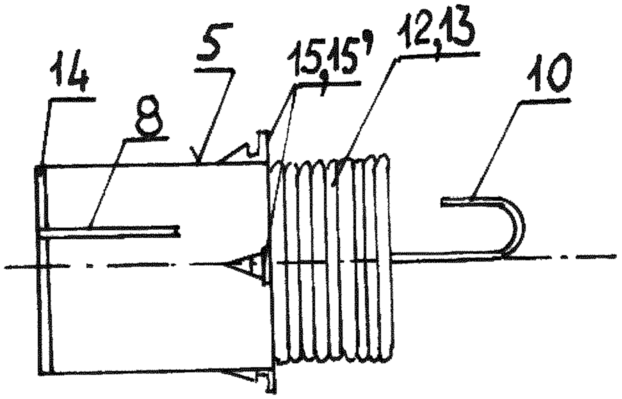
FIG. 7 illustrates a second embodiment of the sleeve with the spring in the rest position.
Figures 4, 5, 6:
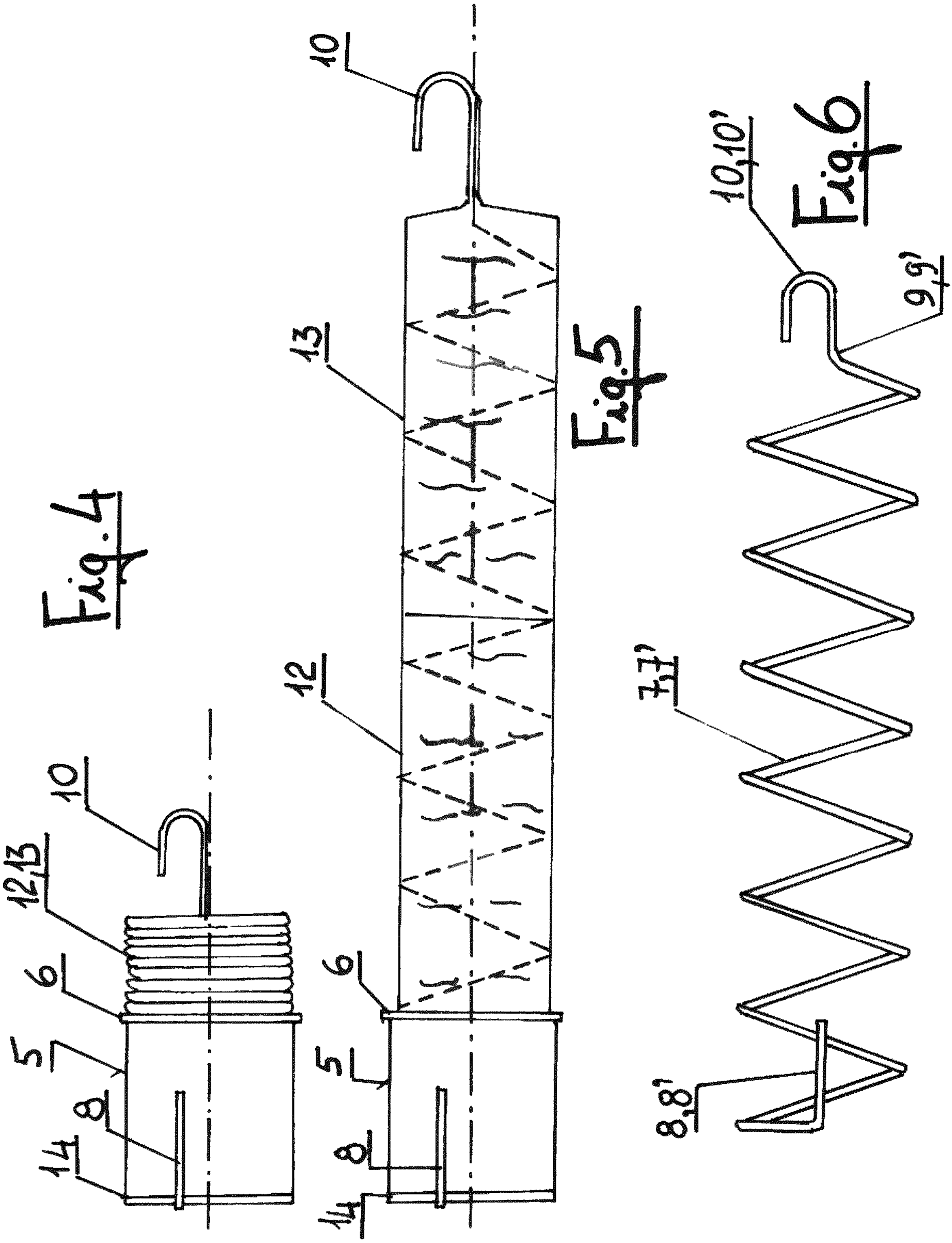
FIG. 4 illustrates the sleeve with the spring in the rest position.
FIG. 5 illustrates the sleeve with the spring in the extended position.
FIG. 6 illustrates the spring in the extended position.

With reference to the aforementioned figures, the device according to this invention is made substantially in the form of a mask and comprises a mask body 1 of any convenient rigid or semi-rigid material suitable to cover the mouth and nose of a person, preferably formed by a first layer 2 and a second layer 2' substantially superimposed on each other and communicating through at least one hole 3 so as to ensure the passage of air between them. At the sides of the mask body there are at least two housings 4, 4' (one on each side) each designed to hold a respective sleeve 5 or 5', preferably shaped like a cylinder or truncated cone and equipped with an edge 6 in the upper part so as to be able to be joined to said body 1. Said sleeve is advantageously made of a rigid or semi-rigid material.

Inside each sleeve 5 or 5' a spring 7 or 7' is inserted, preferably in metal or plastic whose first end 8 or 8' is fixed to the lower edge of the sleeve while the second end 9 or 9' has fixing means which allow the two springs to join together. Such means include a fixing hook 10 or 10' and the springs 7 or 7' are able to extend by several centimetres so that they can be hooked together by means of said hooks 10 and 10' behind the head of the person wearing the mask.

Each spring 7 or 7' is substantially coated for a first portion (for example, for half of its length), the one fixed in the sleeve 5 or 5', by a cylinder 12 or 12' of non-breathable fabric material and for a second portion by a cylinder 13 or 13' of breathable fabric material, for example, non-woven fabric or of the type used for the FFP1, FFP2 or FFP3 masks or other suitable material capable of filtering the air. Therefore, aeration channels connected to said mask 1 are formed.

In this way, air of higher hygienic quality is introduced, being captured by the back of the person's head and, therefore, less exposed to the dust and aerosol concentrations found in the part in front of the person's face. In addition to this, the wear of the filtering material is reduced with obvious advantages in terms of cost and reliability of the device.

The air thus obtained is then filtered by the material of said cylinder 13 or 13' and circulates freely within the mask 1.

Advantageously, the use of a non-return valve 14 or 14' is provided, positioned in the lower end of the sleeve 5 or 5', so that the air expelled in the exhalation phase, rich in carbon dioxide, does not remain on the inside of the mask thus allowing the person wearing it to always breathe well oxygenated air.

In an alternative embodiment, the sleeve 5 or 5' is equipped with at least a pair of snap fins 15 or 15' so as to make it removable from the respective housing 4 or 4'. In this way, it is possible to replace only said sleeve equipped with spring and coating cylinder in case of damage or because it is ruined by wear. In a further alternative embodiment, the fastening means comprise at the second end 9 or 9' of the spring 7 or 7', instead of the hook, a strip of fabric 16, for example, made of Velcro capable of making very quick the hooking and unhooking at the back of a person's head.

A single sleeve 5 equipped with spring 7, cylinder 12 of non-breathable fabric, cylinder 13 of breathable fabric, in case of need, can be used individually as an air filtering device, whereby the person who uses it rests his lips on the open-end part of the sleeve 5 holding it with one hand while with the other hand extends the spring so as to allow the filtering of the air during breathing with the mouth only.

Finally, there are specially shaped housings 18 capable of accommodating Bluetooth headsets.

The embodiments described in this description and the configurations shown in the drawings are only the preferred embodiments of this invention but also the technical variants falling within the above expressed concept of this invention are to be considered protected by this application.

What is claimed is:

1. Protection device of the respiratory tract of a person comprising:

- a mask body of one of a rigid or semi-rigid material suitable to cover the mouth and nose of a person,
- at least one pair of housings placed on the sides of said mask body and configured to hold a sleeve inside each of the housings,
- a spring inserted inside each sleeve, each spring having a first end fixed to a lower edge of the respective sleeve and a second end having a fixing arrangement which allow the two springs to join together behind the head of the person wearing the device,
- each spring being substantially coated for a first portion fixed to the sleeve by a first cylinder of a non-breathable fabric material and for a second portion by a second cylinder of one of a breathable fabric material and other suitable material adapted for filtering the air.

2. Protection device according to claim 1, wherein said first cylinder of non-breathable fabric material covers at least half of the total length of the spring.

3. Protection device according to claim 1, wherein said fixing arrangement comprises on each end of the respective spring a fixing hook and the springs are adapted to extend by several centimeters so that they can be hooked together using the hooks behind the head of the person wearing the device.

4. Protection device according to claim 1, wherein the second cylinder is made of one of: one of non-woven fabric and material used for FFP1, FFP2 or FFP3 masks adapted for filtering the air.

5. Protection device according to claim 1, wherein the springs are made of one of a:

metal material and plastic material.

6. Protection device according to claim 1, wherein the mask body is formed by a first layer and a second layer substantially superimposed on each other and communicating through at least one hole so as to ensure the passage of air between them.

7. Protection device according to claim 1, wherein the lower end of each sleeve is equipped with a non-return valve for air expelled during an exhalation phase of the wearer of the device.

8. Protection device according to claim 1, wherein each sleeve is equipped with a fixing arrangement so as to make it removable from the housing.

9. Protection device according to claim 1, wherein the fixing arrangement of the second end of each spring includes a strip of Velcro fabric adapted for enabling very quick hooking and unhooking at the back of the head of the person wearing the device.

10. Protective device according to claim 1, wherein the mask body is equipped with specially shaped housings capable of accommodating Bluetooth headsets.

11. Air filtering device comprising a sleeve inside which a spring is inserted, fixed at a first end to the sleeve itself and equipped with a hook at a second end thereof, wherein the spring is substantially coated for a first portion fixed to the sleeve by a first cylinder of a non-breathable fabric material and for a second portion by a cylinder of one of a breathable fabric material or other material adapted for filtering the air, whereby the person who uses the device places his lips on an open-end part of the sleeve and extends the spring so as to allow filtering of the air when breathing with the mouth only.

* * * * *